(12) United States Patent
Mynhier et al.

(10) Patent No.: US 7,997,840 B2
(45) Date of Patent: Aug. 16, 2011

(54) SELF LOCKING TENSIONER

(75) Inventors: Charles Robert Mynhier, Magnolia, TX (US); Charles Tyrrell, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 12/471,425

(22) Filed: May 25, 2009

(65) Prior Publication Data

US 2009/0263205 A1 Oct. 22, 2009

Related U.S. Application Data

(62) Division of application No. 11/332,439, filed on Jan. 13, 2006, now Pat. No. 7,722,302.

(51) Int. Cl.
F16B 31/00 (2006.01)
F16B 39/36 (2006.01)
F16B 37/08 (2006.01)

(52) U.S. Cl. ........ 411/14.5; 411/267; 411/915; 411/434

(58) Field of Classification Search .................. 411/267, 411/14.5, 915–917, 434, 433
See application file for complete search history.

(56) References Cited

U.S. PATENT DOCUMENTS

| | | | | |
|---|---|---|---|---|
| 3,033,597 A | * | 5/1962 | Miller | 403/15 |
| 3,841,193 A | * | 10/1974 | Ito | 411/395 |
| 4,182,215 A | * | 1/1980 | Green et al. | 411/434 |
| 5,046,906 A | * | 9/1991 | Bucknell | 411/432 |
| 5,253,967 A | | 10/1993 | Orban et al. | |
| 5,468,106 A | * | 11/1995 | Percival-Smith | 411/434 |
| 5,505,465 A | * | 4/1996 | Hornsby | 277/374 |
| 5,601,505 A | | 2/1997 | Tada | |
| 5,690,458 A | * | 11/1997 | Junkers | 411/432 |
| 5,800,108 A | * | 9/1998 | Cabahug | 411/433 |
| 6,685,406 B2 | | 2/2004 | Whitney et al. | |
| 7,066,699 B2 | * | 6/2006 | Gosling | 411/14.5 |
| 7,140,824 B2 | | 11/2006 | Bucknell | |
| 7,195,439 B2 | * | 3/2007 | Kamppila | 411/434 |
| 2004/0165963 A1 | | 8/2004 | Bucknell | |

OTHER PUBLICATIONS

Pivicat; Bolt Tensioning Equipment; Hydraulic Nuts; http://www.pivicat.com/english/prod_hydraullic.htm; Apr. 2005, 4 pages.
Riverhawk Company; External Stud Tensioner; http://www.riverhawk.com/externalstud.html#self; Apr. 2005, 2 pages.
ZipNut Technology, LLC; Threads Without Threading; http://www.zipnut.com/products, 2000-2003, 1 page.
Hydratight Sweeney, Hydraulic Nuts, www.hydratightsweeney.com/products/hydraulic_nuts, Apr. 2005, 1 page.

* cited by examiner

Primary Examiner — David Reese
(74) Attorney, Agent, or Firm — Duane Morris LLP

(57) ABSTRACT

The present invention is directed to a self locking tensioner that can be used to place a piston or stud in tension. The present invention is directed to a tensioner comprising slip wedges positioned between a piston and a body which houses the piston and the slip wedges.

17 Claims, 6 Drawing Sheets

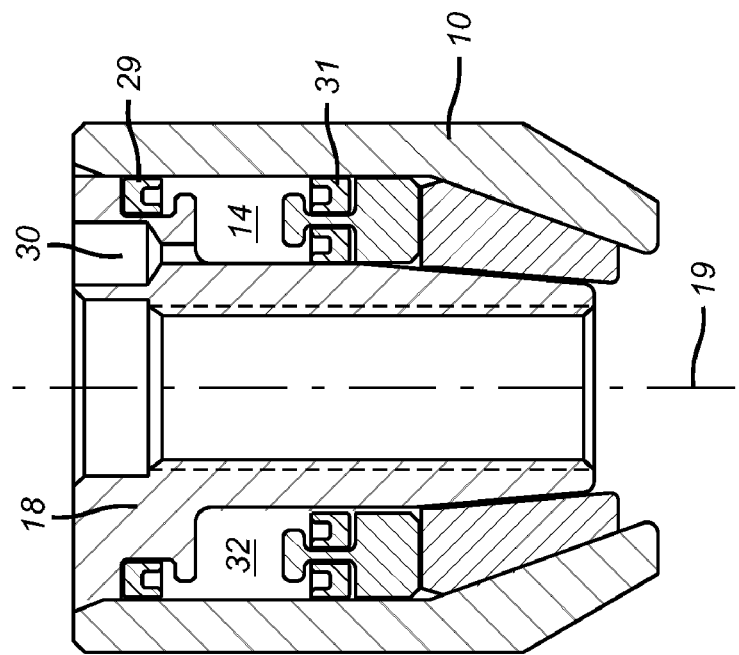
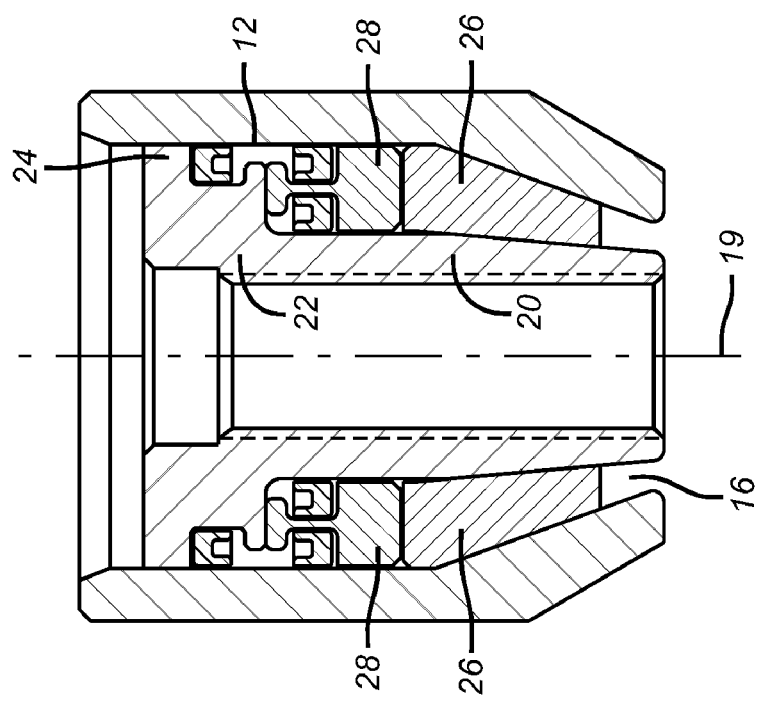

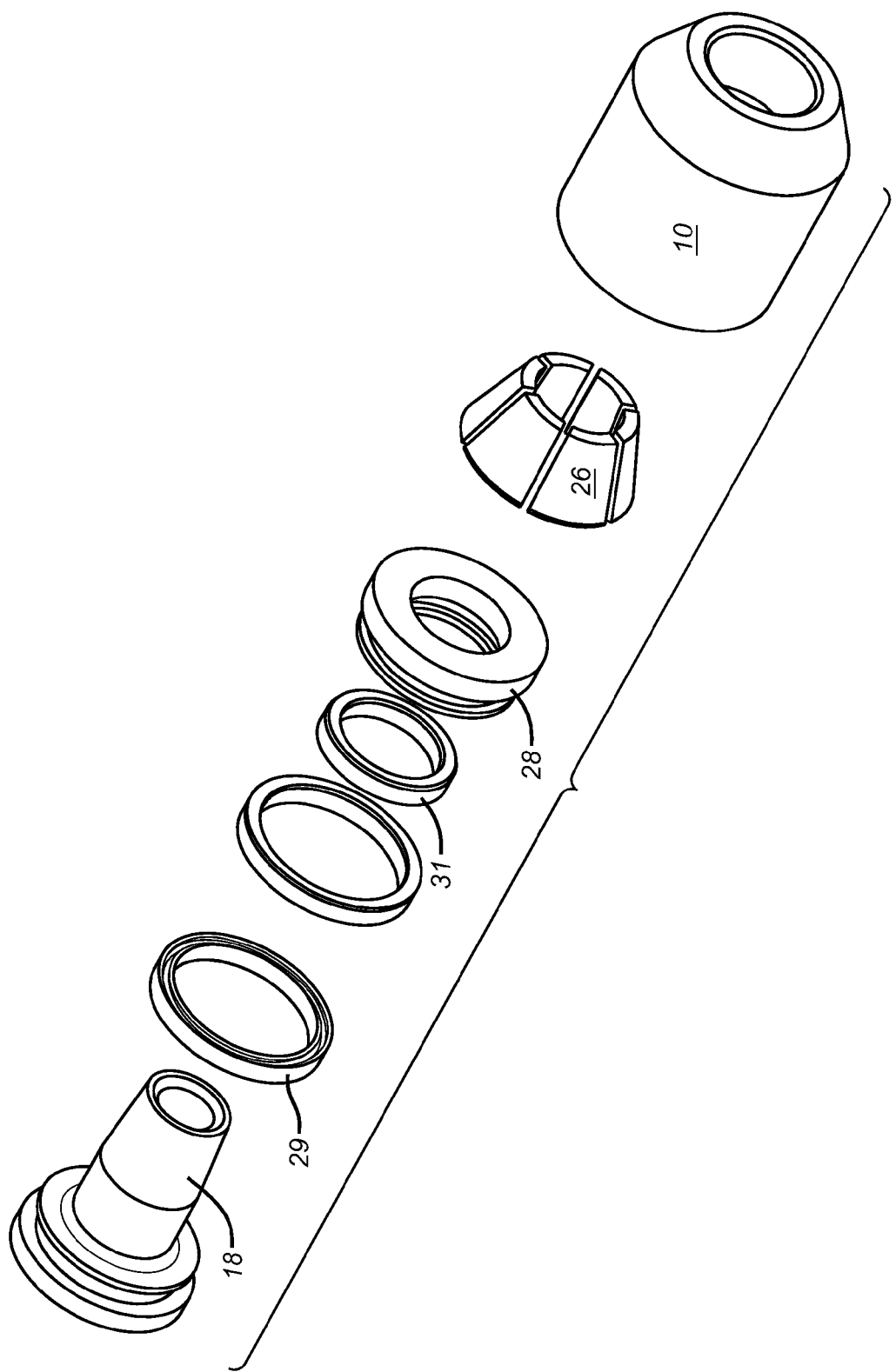

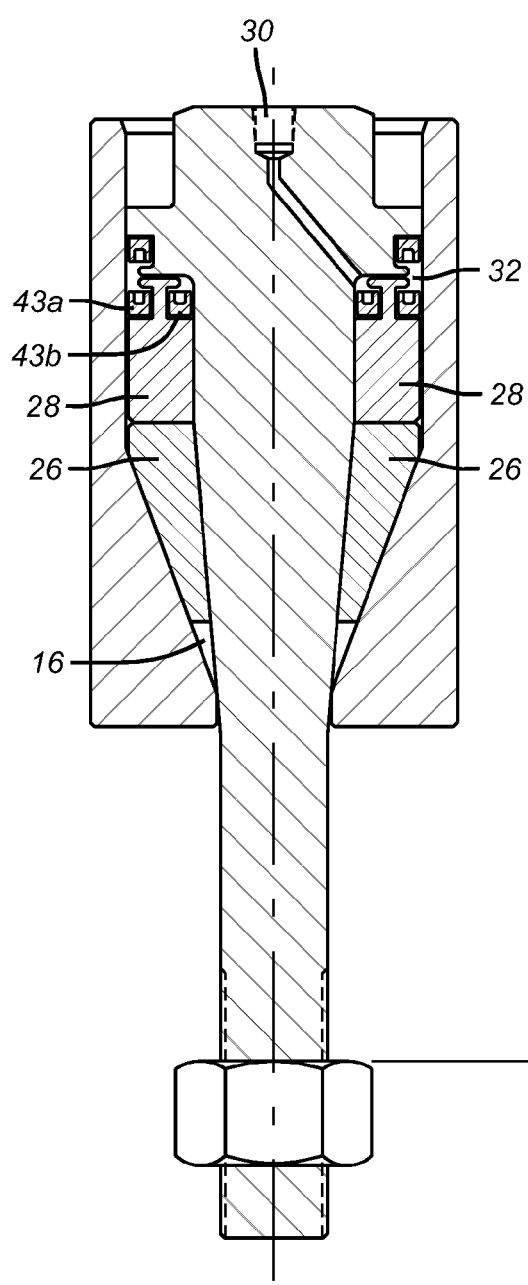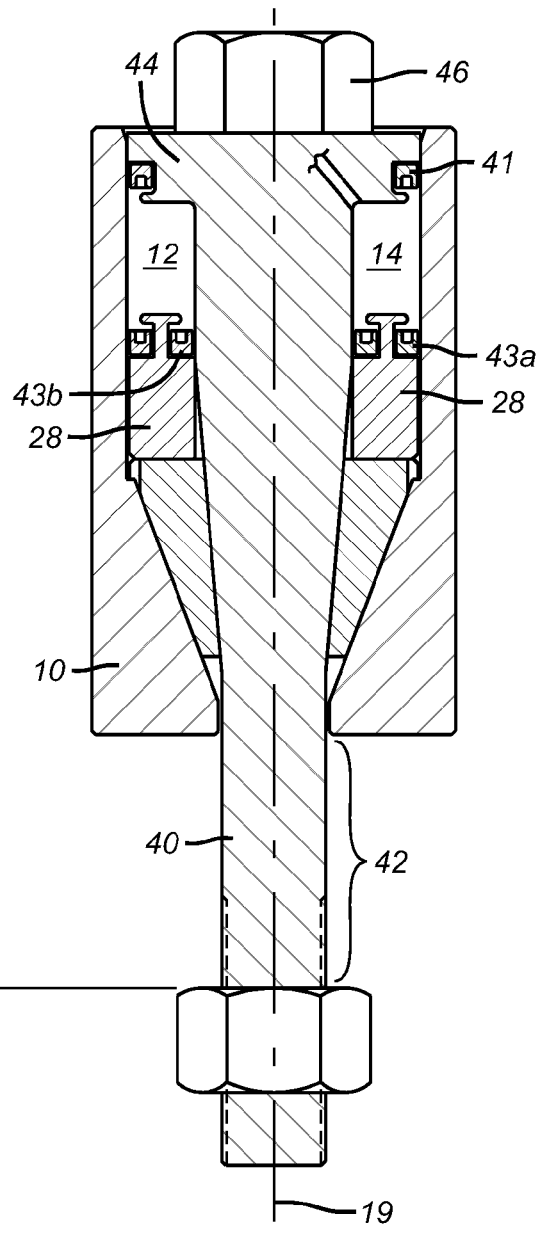
FIG. 3A  FIG. 3B

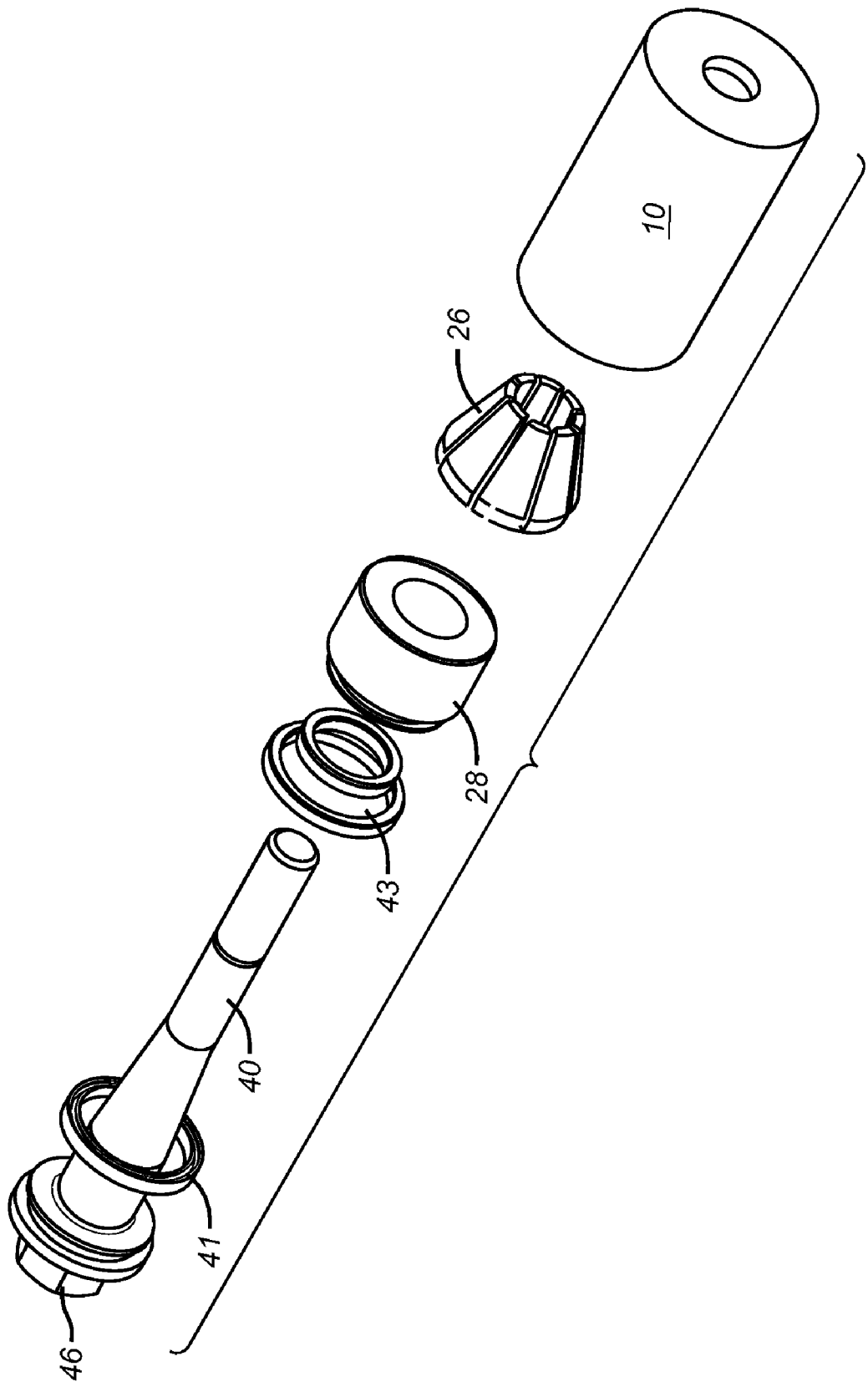

SELF LOCKING TENSIONER

PRIORITY INFORMATION

This application is a divisional application claiming priority from U.S. patent application Ser. No. 11/332,439, filed on Jan. 13, 2006 now U.S. Pat. No. 7,722,302.

FIELD OF THE INVENTION

The present invention is directed to a self locking tensioner that can be used to place a piston or stud in tension. The present invention is directed to a tensioner comprising slip wedges positioned between a piston and a body which houses the piston and the slip wedges.

BACKGROUND OF THE INVENTION

Prior art tensioners typically apply hydraulic forces to tension a stud. Prior art hydraulic tensioners typically involve the use of a nut which must be positioned on the stud while hydraulic pressure is applied. In many applications using a remotely operated vehicle ("ROV"), it is inconvenient to use a tensioner which requires simultaneous positioning of the stud and application of hydraulic pressure.

Prior art tensioners comprising hydraulic nuts require an extra operation to hold the stretched stud. For subsea applications where remotely controlled ROV manipulator arms are used to tension such nuts, this extra operation increases the difficulty of using such tensioners.

The present invention provides a self locking tensioner, which may be tensioned using hydraulic pressure, and which has greater position setting flexibility than do prior art hydraulic tensioners. In another embodiment, the present invention provides a tensioner comprising a fluid operated nut that will automatically hold whatever position the nut is stretched to without an extra operation, as discussed above.

In one preferred embodiment, the present invention provides for tensioning or detensioning of a piston or stud in whatever increment of tensioning or detensioning is desired. The term "detensioning" as used herein, means movement of a tensioned member to reduce the magnitude of tensile force on the member.

BRIEF DESCRIPTION OF THE DRAWINGS

FIG. 1A is a side cross sectional of a first preferred embodiment of the present invention in the untensioned mode.

FIG. 1B is a side cross sectional of a first preferred embodiment of the present invention in the tensioned mode.

FIG. 1C is an exploded isometric view of the first preferred embodiment of the present invention.

FIG. 3A is a side cross sectional of a third preferred embodiment of the present invention in the untensioned mode.

FIG. 3B is a side cross sectional view of a third preferred embodiment of the present invention in the tensioned mode.

FIG. 3C is an exploded isometric view of the third preferred embodiment of the present invention.

DETAILED DESCRIPTION OF THE PREFERRED EMBODIMENTS

Figure 2B:
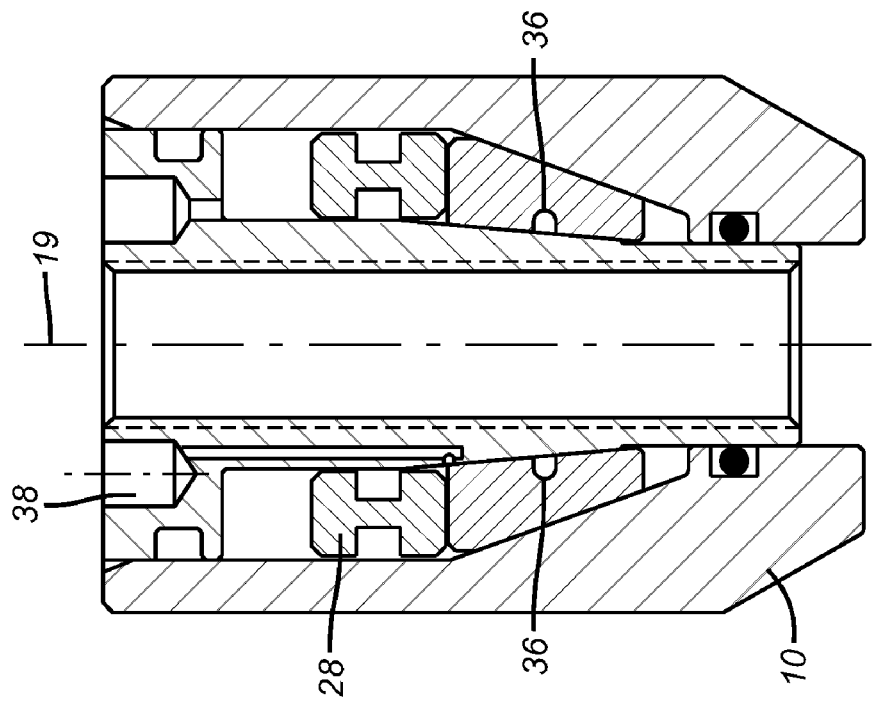
FIG. 2B is a side cross sectional of a second preferred embodiment of the present invention in the tensioned mode.

A first preferred embodiment of the present invention is directed toward a tensioner comprising a body 10 comprising a central channel 12 comprising an upper cylindrical section 14 and a lower conical section 16. In a preferred embodiment, the central channel defines a longitudinal axis 19. This embodiment is depicted in FIGS. 1A, 1B and 1C. This preferred embodiment further comprises a piston member 18 centrally located in the central channel. In the embodiment shown in FIGS. 1A-1C, the cross sectional area of the conical section decreases as the distance from the upper cylindrical section increases. The piston member comprises a longitudinal shaft 20 and a top region 22 comprising an upper lip 24. In a preferred embodiment, the invention further comprises an elastomeric sealing member 29 positioned to form a fluid tight seal between the piston member and the body.

This preferred embodiment further comprises at least two slip wedges 26 extending into the conical section of the central channel adjacent to the piston and a wedge piston 28 mounted above the slip wedges in the central channel. As shown in FIGS. 1A-1C, each of the slip wedges becomes narrower as the distance from the upper cylindrical section increases; In a preferred embodiment, each slip wedge comprises a flat top surface. In another preferred embodiment, each slip wedge comprises an inner surface that is substantially parallel to the longitudinal axis, and an outer surface that is oriented at an acute angle to the inner surface, such that each of the slip wedges becomes narrower as the distance from the upper cylindrical section increases. In another preferred embodiment, the outer surface is substantially parallel to the lower conical section, as shown in FIGS. 1A-1B. In another preferred embodiment, the wedge piston comprises a flat bottom surface. In yet another preferred embodiment, a wedged piston is mounted above each slip wedge. In another preferred embodiment, the invention comprises an outer elastomeric sealing member 31a positioned to form a fluid tight seal between the wedge piston and the body and an inner elastomeric sealing member 31b positioned to form a seal between the wedge piston and the piston member.

This first preferred embodiment of the invention is shown in the untensioned mode in FIG. 1A and in the tensioned mode in FIG. 1B. The wedge pistons 28 and the slip wedges 26 move downward as this embodiment of the invention is placed in the tensioned mode. As the slip wedges move downward into the conical section of the central channel, they exert a tensile or tensioning force on piston member 18.

This preferred embodiment of the invention further comprises a first fluid flowpath 30 extending through the upper lip to a pressurization region 32 of the upper cylindrical section above the wedge piston. In one preferred embodiment, the fluid flowpath is adapted to receive hydraulic fluid. In another preferred embodiment, the fluid flowpath is adapted to receive a gas. As shown in FIGS. 1A and 1B, in a preferred embodiment, the fluid flowpath is oriented substantially parallel to the longitudinal axis.

Figure 2A:
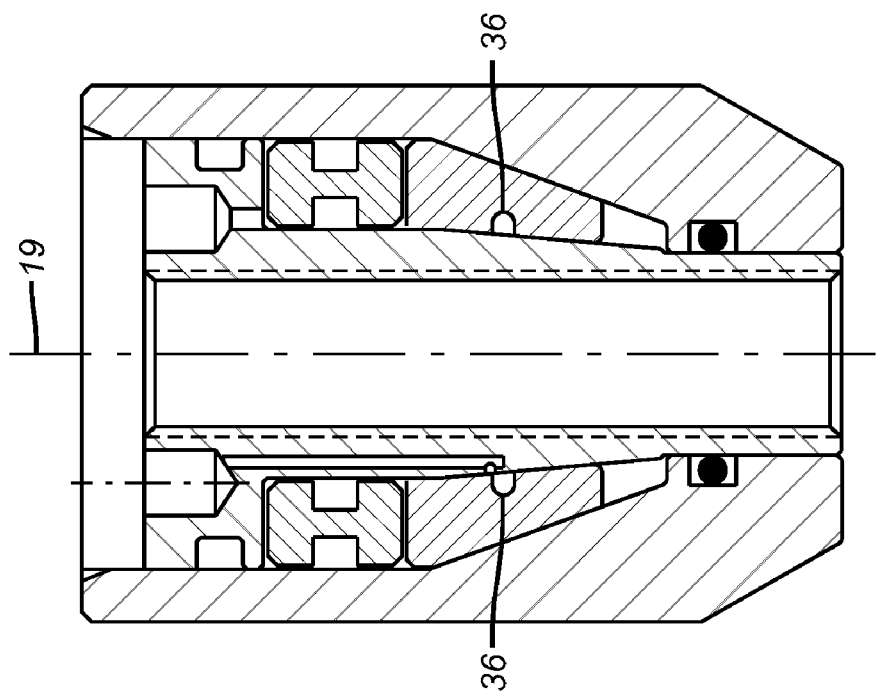
FIG. 2A is a side cross sectional of a second preferred embodiment of the present invention in the untensioned mode.
Figure 2C:
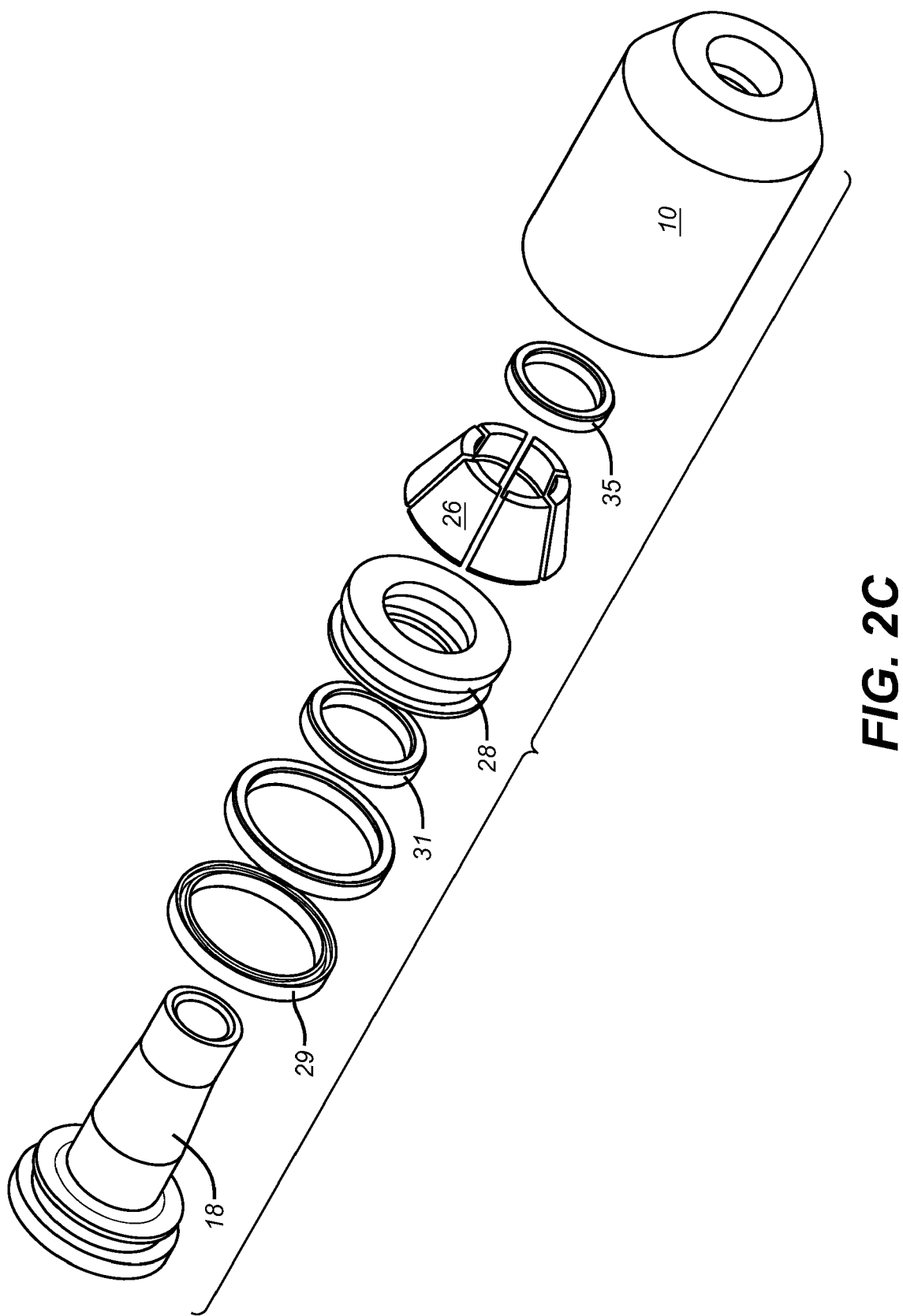
FIG. 2C is an exploded isometric view of the second preferred embodiment of the present invention.

Another preferred embodiment of the present invention is depicted in FIGS. 2A, 2B, and 2C. This preferred embodiment comprises the body, piston member, two slip wedges, wedge piston, and first fluid flowpath, as described above. Additionally, the second preferred embodiment comprises a spring 36 inserted between each slip wedge and the piston member, and a second fluid flowpath 38 extending through the piston to a region between a slip wedge and a wedge piston. The spring facilitates detensioning of the piston member. In a preferred embodiment, the second fluid flowpath is radially opposite the first fluid flowpath.

This second preferred embodiment of the invention is shown in the untensioned mode in FIG. 2A and in the tensioned mode in FIG. 2B. The wedge pistons 28 and the slip wedges 26 move downward as this embodiment of the invention is placed in the tensioned mode. As the slip wedges move downward into the conical section of the central channel, they exert a tensile or tensioning force on piston member 18.

This preferred embodiment of the invention further comprises a seal 35 located in the body below the lower conical section. This seal is positioned in a sealing relationship between the piston member and the body. In a preferred embodiment, the seal is elastomeric.

Another preferred embodiment of the present invention is depicted in FIGS. 3A, 3B, and 3C. This preferred embodiment comprises the body 10, comprising a central channel 12 which comprises an upper cylindrical section 14 and a lower conical section 16, as described above. This preferred embodiment further comprises a stud 40 which is centrally located in the central channel. The stud comprises a longitudinal shaft 42 and a top region 44. This preferred embodiment further comprises a nut 46 which is integral with the stud and located within the central channel.

This preferred embodiment further comprises at least two slip wedges 26 extending into the conical section of the central channel and a wedge piston 28 mounted above the slip wedges in the central channel. In a preferred embodiment, each slip wedge comprises a flat top service. In yet another preferred embodiment, the wedge piston comprises a flat bottom surface.

The invention further comprises a fluid flowpath 30 extending through the stud to a pressurized region 32 of the upper cylindrical section, above the wedge piston. As shown in FIG. 3A, the fluid flowpath comprises an upper region substantially parallel to the central channel and a lower region that is oriented diagonally to the upper region. In one preferred embodiment, the fluid flowpath is adapted to receive hydraulic fluid. In another preferred embodiment, the fluid flowpath is adapted to receive a gas.

This third preferred embodiment of the invention is shown in the untensioned mode in FIG. 3A and in the tensioned mode in FIG. 3B. The wedge pistons 28 and the slip wedges 26 move downward as this embodiment of the invention is placed in the tensioned mode. As the slip wedges move downward into the conical section of the central channel, they exert a tensile or tensioning force on stud 40.

In another preferred embodiment, the invention further comprises an upper elastomeric sealing member 41 positioned to form a fluid tight seal between the stud and the body. In another preferred embodiment, the invention further comprises an outer elastomeric sealing member 43a positioned to form a fluid tight seal between the wedge piston and the body and an inner elastomeric sealing member 43b positioned to form a fluid tight seal between the wedge piston and the stud.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A hydraulic tensioner comprising:
   (a) a body comprising a central channel comprising an upper cylindrical section and a lower conical section, said central channel defining a longitudinal axis;
   (b) a stud centrally located in said central channel comprising a longitudinal shaft and a top region;
   (c) a nut integral with the stud and located within the central channel;
   (d) at least two slip wedges extending into the conical section of the central channel and wherein each of said slip wedges becomes narrower as the distance from the upper cylindrical section increases;
   (e) a wedge piston mounted above the slip wedges in the central channel; and
   (f) a fluid flowpath extending through the stud to a pressurization region of the upper cylindrical section above the wedge piston.

2. The tensioner of claim 1, wherein the cross sectional area of the conical section decreases as the distance from the upper cylindrical section increases.

3. The tensioner of claim 1, wherein the wedge piston comprises a flat bottom surface.

4. The tensioner of claim 3, wherein each slip wedge comprises a flat top surface.

5. The tensioner of claim 1, further comprising an outer elastomeric sealing member positioned to form a fluid tight seal between the wedge piston and the body.

6. The tensioner of claim 5, further comprising an inner elastromeric sealing member positioned to form a fluid tight seal between the wedge piston and the stud.

7. A hydraulic tensioner comprising:
   (a) a body comprising a central channel comprising an upper cylindrical section and a lower conical section, said central channel defining a longitudinal axis;
   (b) a stud centrally located in said central channel comprising a longitudinal shaft and a top region;
   (c) a nut integral with the stud and located within the central channel;
   (d) at least two slip wedges extending into the conical section of the central channel, each of said slip wedges comprising an inner surface that is substantially parallel to the longitudinal axis, and an outer surface that is oriented at an acute angle to the inner surface, such that each of the slip wedges becomes narrower as the distance from the upper cylindrical section increases;
   (e) a wedge piston mounted above the slip wedges in the central channel; and
   (f) a fluid flowpath extending through the stud to a pressurization region of the upper cylindrical section above the wedge piston.

8. The tensioner of claim 7, wherein the wedge piston comprises a flat bottom surface.

9. The tensioner of claim 8, wherein each slip wedge comprises a flat top surface.

10. The tensioner of claim 7, further comprising an outer elastomeric sealing member positioned to form a fluid tight seal between the wedge piston and the body.

11. The tensioner of claim 10, further comprising an inner elastomeric sealing member positioned to form a fluid tight seal between the wedge piston and the stud.

12. The tensioner of claim 7, wherein the fluid flowpath comprises an upper region substantially parallel to the central channel and a lower region that is oriented diagonally to the upper region.

13. A hydraulic tensioner comprising:
   (a) a body comprising a central channel comprising an upper cylindrical section and a lower conical section, said channel defining a longitudinal axis;
   (b) a stud centrally located in said central channel comprising a longitudinal shaft and a top region;
   (c) a nut integral with the stud and located within the central channel;

(d) at least two slip wedges extending into the conical section of the central channel;

(e) a wedge piston mounted above the slip wedge in the central channel; and (f) a fluid flowpath extending through the stud to a pressurization region of the upper cylindrical section above the wedge piston, said fluid flowpath comprising an upper region substantially parallel to the central channel and a lower region that is oriented diagonally to the upper region.

14. The tensioner of claim 13, wherein each of said slip wedges becomes narrower as the distance from the upper cylindrical section increases.

15. The tensioner of claim 14, wherein the cross sectional area of the conical section decreases as the distance from the upper cylindrical section increases.

16. The tensioner of claim 13, further comprising an outer elastomeric sealing member positioned to form a fluid tight seal between the wedge piston and the body.

17. The tensioner of claim 16, further comprising an inner elastomeric sealing member positioned to form a fluid tight seal between the wedge piston and the stud.

* * * * *